(12) United States Patent
Sherkin et al.

(10) Patent No.: US 8,214,646 B2
(45) Date of Patent: Jul. 3, 2012

(54) BUNDLE VERIFICATION

(75) Inventors: Alexander Sherkin, Newmarket (CA); Michael Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1074 days.

(21) Appl. No.: 12/115,799

(22) Filed: May 6, 2008

(65) Prior Publication Data

US 2009/0282255 A1 Nov. 12, 2009

(51) Int. Cl.
*H04L 9/32* (2006.01)
(52) U.S. Cl. ........ 713/176; 709/201; 709/202; 709/203; 713/161
(58) Field of Classification Search ............ 713/176, 713/161; 709/201–203
See application file for complete search history.

(56) References Cited

U.S. PATENT DOCUMENTS

| | | | |
|---|---|---|---|
| 7,124,408 B1 * | 10/2006 | Parthasarathy et al. ....... | 717/170 |
| 2001/0018739 A1 * | 8/2001 | Anderson et al. ............. | 713/176 |
| 2003/0056102 A1 * | 3/2003 | Aho et al. ..................... | 713/176 |
| 2003/0097579 A1 | 5/2003 | England et al. | |
| 2005/0251682 A1 * | 11/2005 | Collins et al. ................ | 713/176 |

FOREIGN PATENT DOCUMENTS

| | | |
|---|---|---|
| CA | 2665445 | 11/2009 |
| EP | 2116953 | 11/2009 |

OTHER PUBLICATIONS

Search and Examination Report. European Application No. 08155746.4. Dated Jul. 16, 2008.

* cited by examiner

*Primary Examiner* — David Pearson
*Assistant Examiner* — Angela Holmes
(74) *Attorney, Agent, or Firm* — Bereskin & Parr LLP/ S.E.N.C.R.L., s.r.l

(57) ABSTRACT

Systems, devices, and methods for modifying a signed bundle and verifying the modified bundle are disclosed. A signed bundle may be modified by removing a file specified in a server file list from a plurality of files in the bundle. The signed bundle comprises a catalog of files in the signed bundle and their associated hashes. The modified bundle includes the remaining files of the signed bundle that are not specified in the server file list and the catalog file of the signed bundle, the catalog signature of the signed bundle. The modified bundle may be verified by verifying the catalog signature of the modified signed bundle, and checking that the files specified in the catalog are either in the modified signed bundle or specified in the server file list. The hashes of the files in the modified signed bundle may also be checked to verify the modified signed bundle.

23 Claims, 11 Drawing Sheets

BUNDLE VERIFICATION

TECHNICAL FIELD

The present disclosure relates generally to distributing bundles, and more particularly to verifying bundles' authenticity in a distributed environment.

BACKGROUND

Many systems need to be able to transport a bundle (a set of files) over unsecure media. In order to protect these files, bundles are sometimes digitally signed. To sign a bundle, a secure hash of each file in the bundle is calculated and recorded in a catalog file. Different secure hashes may be used such as, for example, Message Digest 5 (MD5) algorithms or Secure Hash Algorithms (SHA) such as SHA-1. Once the hash has been calculated for all of the files, the catalog file is digitally signed. The signing of the catalog file may comprise signing the catalog file using asymmetric cryptography techniques such as Digital Signature Algorithm (DSA). The catalog file signature is then stored in a catalog signature file that is added to the bundle as the bundle signature. The public key of the key pair and possibly a certificate for verifying the owner of the private key may be included in the signed bundle to facilitate verification of the bundle signature. Public Key Cryptography Standards 7 (PKCS7) is one example of digital signature format that includes a signer certificate.

A person skilled in the art can appreciate that the bundle signature cannot be modified without knowledge of the correct private key. It is therefore possible, assuming the bundle signature is verified, to trust that the catalog file has not been modified, and so the hashes of the files stored in the catalog file will match the calculated hash of the files delivered in the bundle as long as the bundle has not been modified, (e.g., files have been added or removed) and to trust that the files of the bundle have not been modified, such as by adding, removing or modifying data of the individual files.

For example, Java archive (JAR) file signatures work as described above. The JAR file includes the individual files, as well as a signature file that comprises a list of the files in the JAR file as well as a hash of each file. A signed JAR file also comprises a signature block file, which is the signed signature file.

BRIEF DESCRIPTION OF THE DRAWINGS

An embodiment of the present disclosure will now be described, by way of example only, with reference to the following drawings in which.

DETAILED DESCRIPTION

Figure 1A:
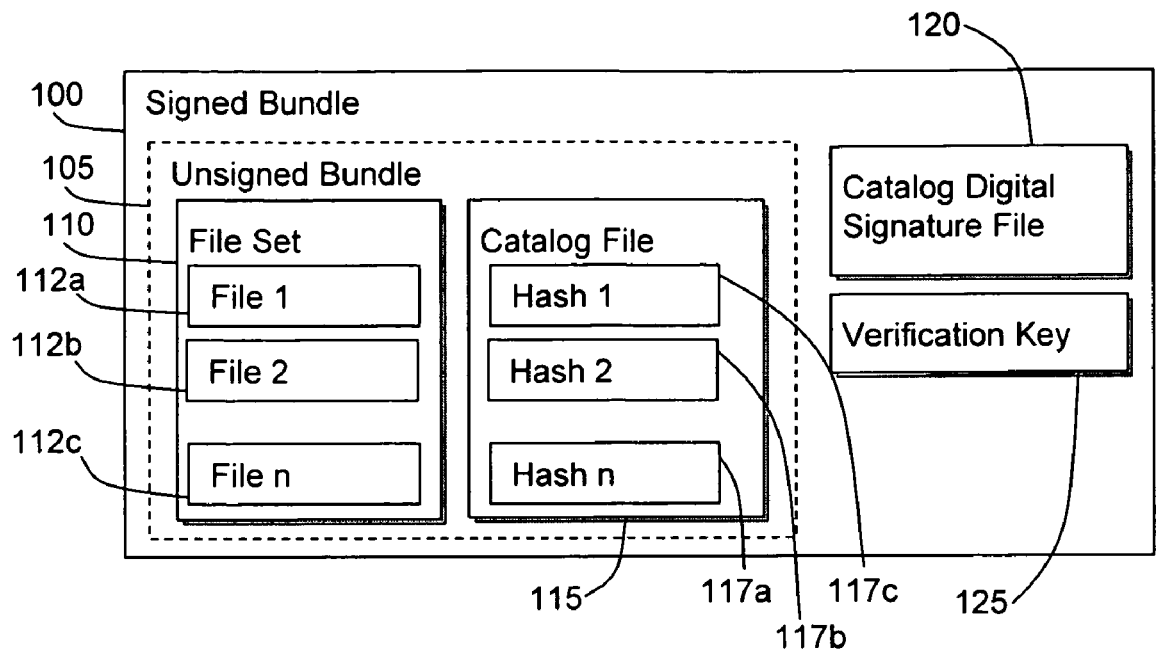
FIG. 1a depicts in a logical block diagram, components of signed bundle in accordance with the present disclosure.

In accordance with the present disclosure, there is provided a method of processing a signed bundle comprising a plurality of files, a catalog file specifying the plurality of files and associated file hashes, and a catalog signature. The method comprises receiving the signed bundle at a server, verifying the received signed bundle on the server, generating a server file list specifying at least one file of the plurality of files to be removed from the signed bundle at the server. Once the signed bundle is verified, the method further comprises removing the file specified in the server file list from the plurality of files of the signed bundle to generate a modified singed bundle and generating a modified signed bundle for sending to a device. The modified signed bundle comprises a set of remaining files comprising files of the plurality of files not specified in the server file list, the catalog file of the signed bundle, and the catalog signature of the signed bundle.

In accordance with the present disclosure, there is further provided a method of verifying a modified signed bundle on a device. The modified signed bundle comprises a plurality of files, a catalog file of a signed bundle specifying the plurality of files and at least one file removed from the signed bundle. The catalog file also specifies a file hash for each of the plurality of files and for the removed file. The modified signed bundle also includes a catalog signature file of the signed bundle. The method comprises receiving the modified signed bundle at the device, generating a server file list specifying the at least one file removed from the signed bundle, verifying the catalog file using the catalog signature file to ensure the catalog file has not been modified since signing, and verifying each file specified in the catalog file. Each file specified in the catalog file is verified by verifying that the file is either specified in the generated server file list or is included in the plurality of files of the modified signed bundle and if the file is included in the plurality of files of the modified signed bundle, verifying the file by generating a hash of the file and verifying that the generated hash matches a corresponding hash for the file in the associated file hashes in the catalog file of the signed bundle.

In accordance with the present disclosure, there is further provided a system for modifying a signed bundle. The system comprises a memory for storing instructions, a processor for executing the instructions stored in memory, and a repository for storing a server file list specifying at least one file to be removed from the signed bundle to generate a modified signed bundle and the signed bundle. The signed bundle comprises a plurality of files, a catalog comprising a list of files in the signed bundle and a hash of each file in the signed bundle. The signed bundle also comprises a catalog signature file. The system for modifying the signed bundle also includes a bundle modifier for removing the file specified in the server file list from the plurality of files of the signed bundle and generating a modified signed bundle. The modified signed bundle may include a set of remaining files comprising files of the plurality of files not specified in the server file list, the catalog file of the signed bundle, and the catalog signature of the signed bundle.

In accordance with the present disclosure, there is further provided a server comprising the system for modifying the signed bundle and a communications interface for sending the modified signed bundle using a network infrastructure.

In accordance with the present disclosure, there is provided a system for verifying a modified signed bundle, the system comprises a memory for storing instructions, a processor for executing the instructions stored in memory, a repository and a bundle processor for verifying the files in the signed bundle using the signed modified bundle and the server file list. The repository stores a server file list specifying at least one file removed from a signed bundle to generate the modified signed bundle, and the modified signed bundle. The modified signed bundle comprises a plurality of files, a catalog and a catalog signature file. The catalog includes a list of files in the signed bundle, and a hash of each file in the signed bundle.

In accordance with the present disclosure, there is provided a mobile device comprising the system for verifying the modified signed bundle and a wireless receiver for receiving the modified signed bundle.

Prior methods of bundle verification work well for distributing packages over an unsecured media; however, files cannot be removed from a signed bundle without causing the bundle to fail verification. It may be desirable to remove files from a bundle in a distributed computing environment, where different files of the bundles are intended for use at different locations.

In a distributed computing environment, processing may be spread across multiple devices. For example, in a wireless environment, a distributed application may comprise components intended for a mobile device and components intended for a server. It may not be desirable to deliver the components intended for the server to the wireless device, for example, for security reasons or for limiting the amount of data sent to the wireless device which may save time and money.

Using the prior method of signing a bundle does not allow for the verification of a bundle that has had any files removed from the file set. The systems and methods described herein, on the other hand, provide for verification of a modified signed bundle. A signed bundle may be modified by removing specific files from it. The modified bundle will pass verification if the remaining files have not been modified, no files have been added to the modified bundle and only the specified files have been removed from the bundle.

A bundle may be signed by the creator (or a third party) to ensure it has not been modified. As described herein, files that are intended to be removed may be removed from the bundle, resulting in the modified bundle. Although the modified bundle has had one or more files removed, the modified bundle may be successfully verified as described herein. The modified bundle verification will fail if the bundle was further modified, such as by changing a file remaining in the modified bundle, adding a file to the modified bundle, or removing a file not intended to be removed.

When modifying a signed bundle, specified files may be removed; however the catalog file and the catalog digital signature file are not changed. If prior methods of bundle verification were performed on the modified bundle, verification would fail.

In order to verify the modified bundle, the verification process will use a list of files that were present in the file set of the signed bundle, but were removed to generate the modified signed bundle. The modified signed bundle may be verified by the device using the list, by verifying that the only files removed from the file set of the original bundle are those specified in the list, and that the hashes in the catalog file match those calculated for the remaining files present in the modified bundle.

Modifying a signed bundle, and verifying a modified signed bundle as described herein can advantageously be used to, for example, provision applications or other files to a server and device in a distributed computing environment. Systems and methods are further described herein with reference to distributing a signed application bundle that comprises components (e.g., files) that are intended only for a server, and components (e.g., files) intended for a device. The components intended for the server are specified in a server file list. Other embodiments of the modified bundle verification system and method are envisioned as described further herein.

FIG. 1a depicts in a logical block diagram, components of a signed bundle 100. The signed bundle 100 comprises an unsigned bundle 105, a catalog digital signature file 120, and a verification key 125 for verifying the catalog digital signature file 120. The unsigned bundle 105 comprises a file set 110 which comprises a set of files 112a, 112b, 112c. The unsigned bundle 105 also comprises a catalog file 115, which comprises a computed hash 117a, 117b, 117c for each file in the file set 110. The unsigned bundle 105 may be signed by digitally signing the catalog file 115 and storing the catalog digital signature in the catalog digital signature file 120, and the key for verifying the catalog digital signature in the signature key 125.

Figure 1B:
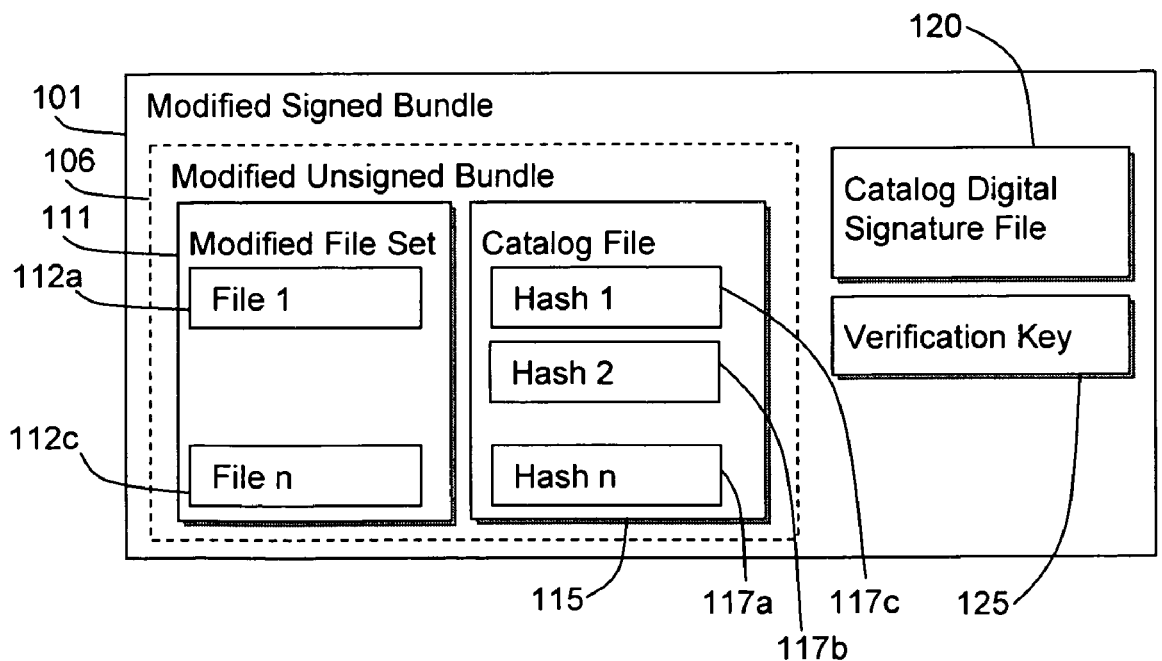
FIG. 1b depicts in a logical block diagram, components of a modified signed bundle in accordance with the present disclosure.

FIG. 1b depicts in a logical block diagram, components of a modified signed bundle 101. For illustrative purposes, it is assumed that the modified signed bundle 101 is the signed bundle 100, modified according to a server file list indicating that file 2 (112b) should be removed from the signed bundle 100 at the server. The modified signed bundle 101 comprises a modified unsigned bundle 106, the catalog digital signature file 120 and verification key 125 (which are the same as the catalog digital signature file 120 and the verification key 125 of the signed bundle 100). The modified unsigned bundle 101 comprises a modified file set 111 and the catalog file 115, which is the same as the catalog file of the signed bundle 100. The modified file set 111 comprises the same files 112a and 112c as the file set 110 of the signed bundle; however file 112b has been removed. The remaining files of the modified file set 111 are the files not specified in the server file list. Although the file 112b is not present in the modified file set 111, its corresponding hash 117b remains in the catalog file 115.

Figure 2:
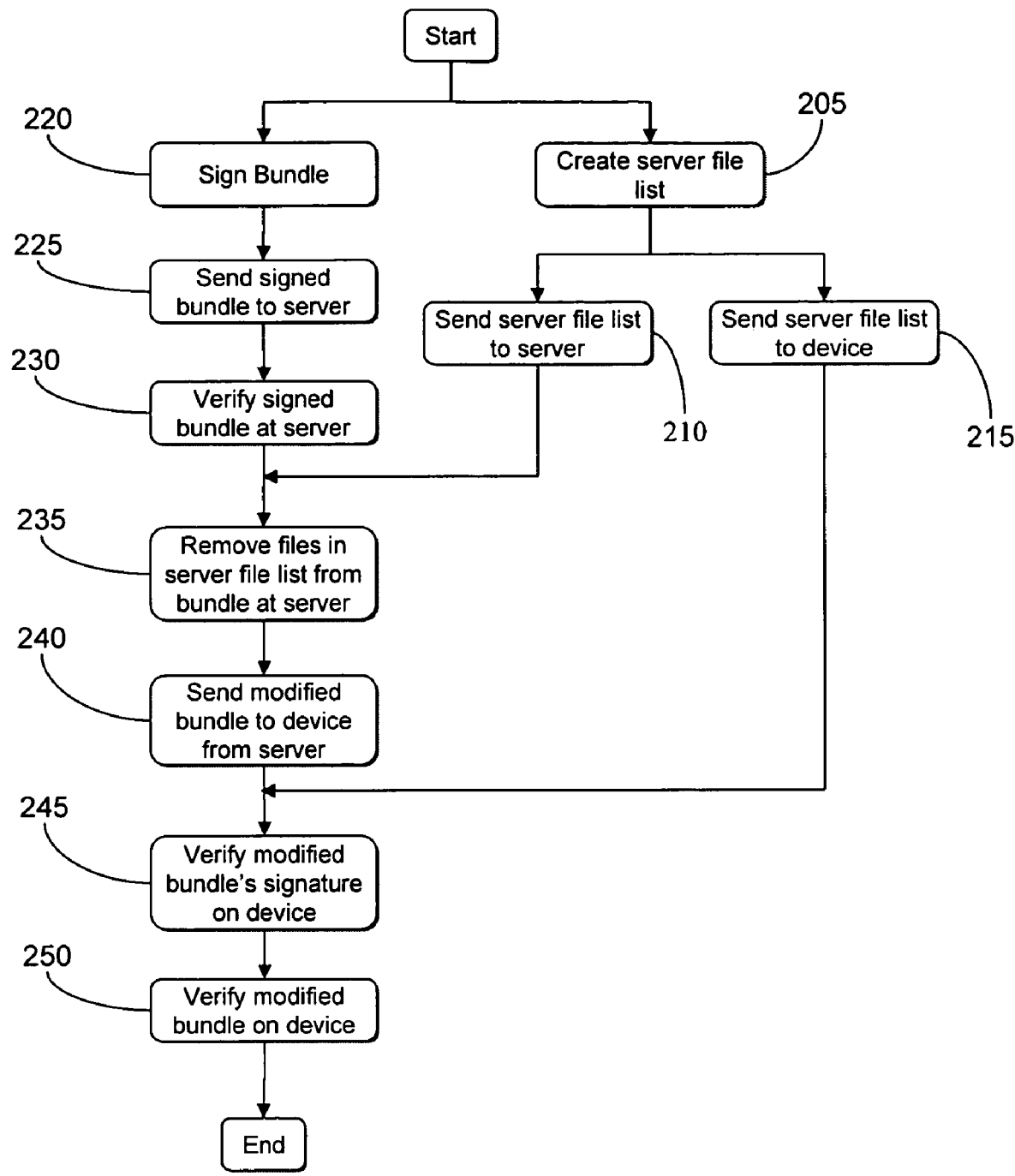
FIG. 2 depicts in a flow chart exemplary steps of modifying and verifying a bundle in accordance with the present disclosure.

FIG. 2 depicts in a flow chart, exemplary steps of modifying a signed bundle and verifying a modified signed bundle. The bundle may be a bundle as depicted in FIG. 1a, comprising a collection of files 112 stored in a file set 110, some of which are intended for a server and some of which are intended for a device. At step 205 a server file list is created. The server file list comprises a list of files in the bundle that are intended to be removed by the server. At step 210 the server file list is sent to the server, and at step 215 the server file list is sent to the device. The server file list may comprise a known list of files, in which case the list may be sent to the server or device in various ways such as, for example, by hard coding the server file list at the server or device or by provisioning the information onto the device and server. Additionally or alternatively the server file list may be sent to the server or the device as a separate file, typically over a secure connection. Furthermore, the server file list may be incorporated into the signed bundle, and sent to the server and device as part of the signed bundle and modified signed bundle.

At step 220 the bundle is signed. Signing the bundle allows the bundle to be verified by the server and the device. Signing the bundle comprises generating a secure hash 117a, b, c for each file 112a, b, c in the bundle and storing each calculated secure hash in a catalog file 115. The catalog file 115 is then signed, for example, using asymmetric encryption techniques such as the Digital Signature Algorithm (DSA), resulting in the catalog digital signature file 120. The catalog digital signature file 120 is added to the signed bundle 100. The verification key 125 for verifying the catalog digital signature file may also be added to the signed bundle 100. The verification key 125 may comprise the public key associated with the private key used to digitally sign the catalog file. Additionally or alternatively, the verification key 125 may comprise a certificate signed by a certificate authority. The certificate may include the public key that can be used to verify the catalog digital signature file. Although the use of a certificate is not required it provides additional security by allowing for authentication of the owner of the private key corresponding to the public key used as the verification key. For example the certificate may indicate that the private/public key used for signing and verifying the catalog file is owned by Company X. The knowledge of the owner of the private/public key may be useful in deciding whether or not to trust the content of the files of the signed bundle.

Once the bundle is signed, it is sent to the server at step 225. At step 230 the server verifies the signed bundle 100. Verifying the signed bundle 100 may comprise verifying the catalog digital signature file 120 using the verification key 125. Then, hashes may be generated for each file 112 in the file set 110, and checked against the original hashes 117 stored in the catalog file 115 of the signed bundle 100. If all of the file hashes match the original hashes 117a, b, c stored in the catalog file 115 then the signed bundle 100 is verified.

At step 235 the server removes the files specified in the server file list from the received signed bundle 100. In the example shown in FIG. 1b, the server file list would indicate file #2 112b is to be removed from the file set 110. At step 240 the modified bundle 101, with the file or files indicated in the server file list removed, is sent to the device. At step 245 the device verifies the catalog digital signature file 120 of the modified signed bundle 101 using the verification key 125, which may correspond to the same procedure as described above for verifying 230 the catalog digital signature file of the signed bundle 100. If the catalog digital signature file 120 of the modified signed bundle 101 was verified, then at step 250 the device verifies the modified bundle.

Figure 3:
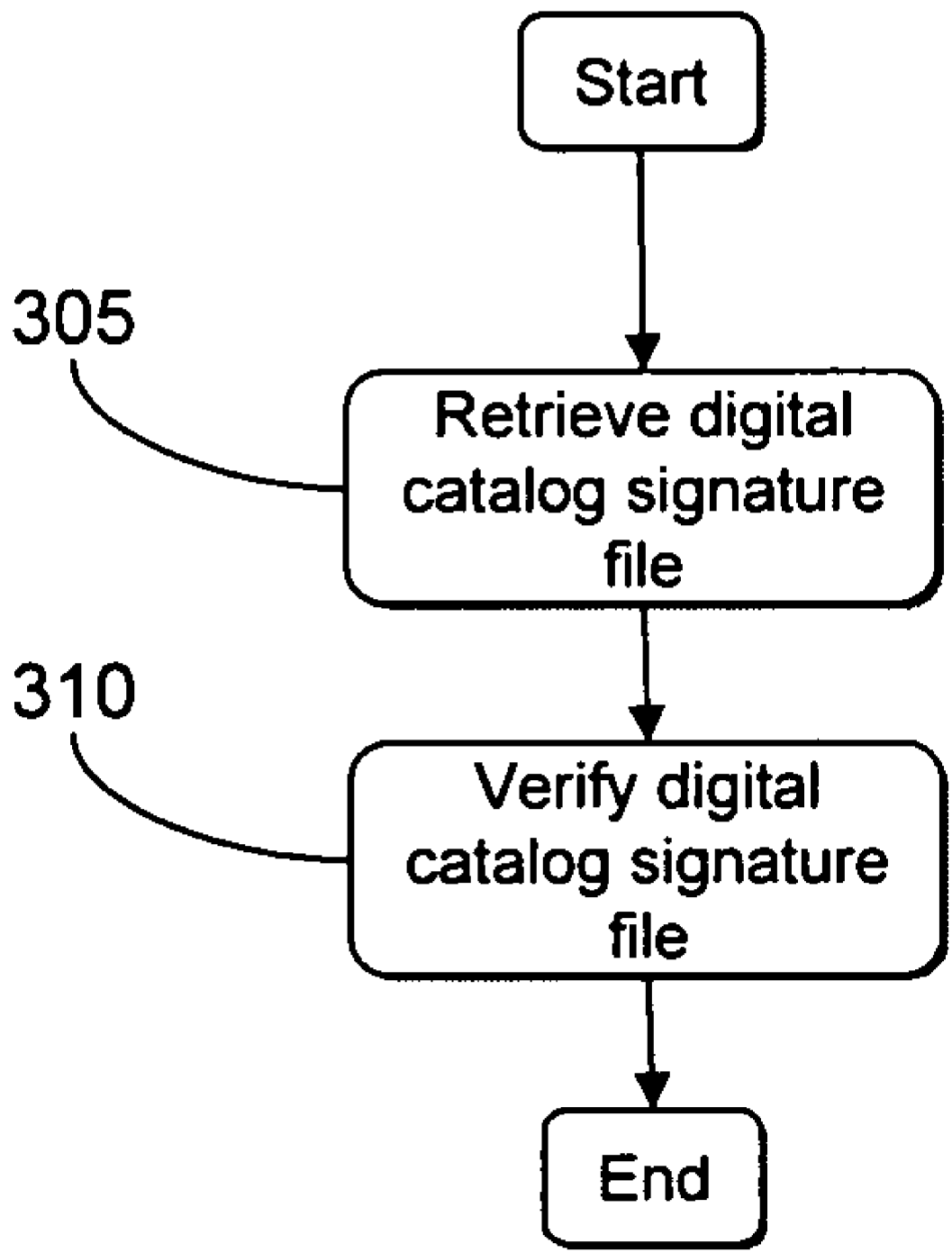
FIG. 3 depicts in a flow chart exemplary steps of verifying a modified bundle's signature in accordance with the present disclosure.

FIG. 3 depicts in a flow chart exemplary steps of verifying a modified signed bundle's catalog digital signature file 120. As described above, the method of verifying the catalog digital signature file of the modified signed bundle may correspond to the method of verifying the catalog digital signature file of the signed bundle. The method begins at step 305 by retrieving the catalog digital signature file 120 from the modified signed bundle 101. At step 310 the retrieved catalog digital signature file 120 is then verified using the verification key 125, and the appropriate verification technique, i.e., the technique used for generating the catalog digital signature file.

Figure 4:
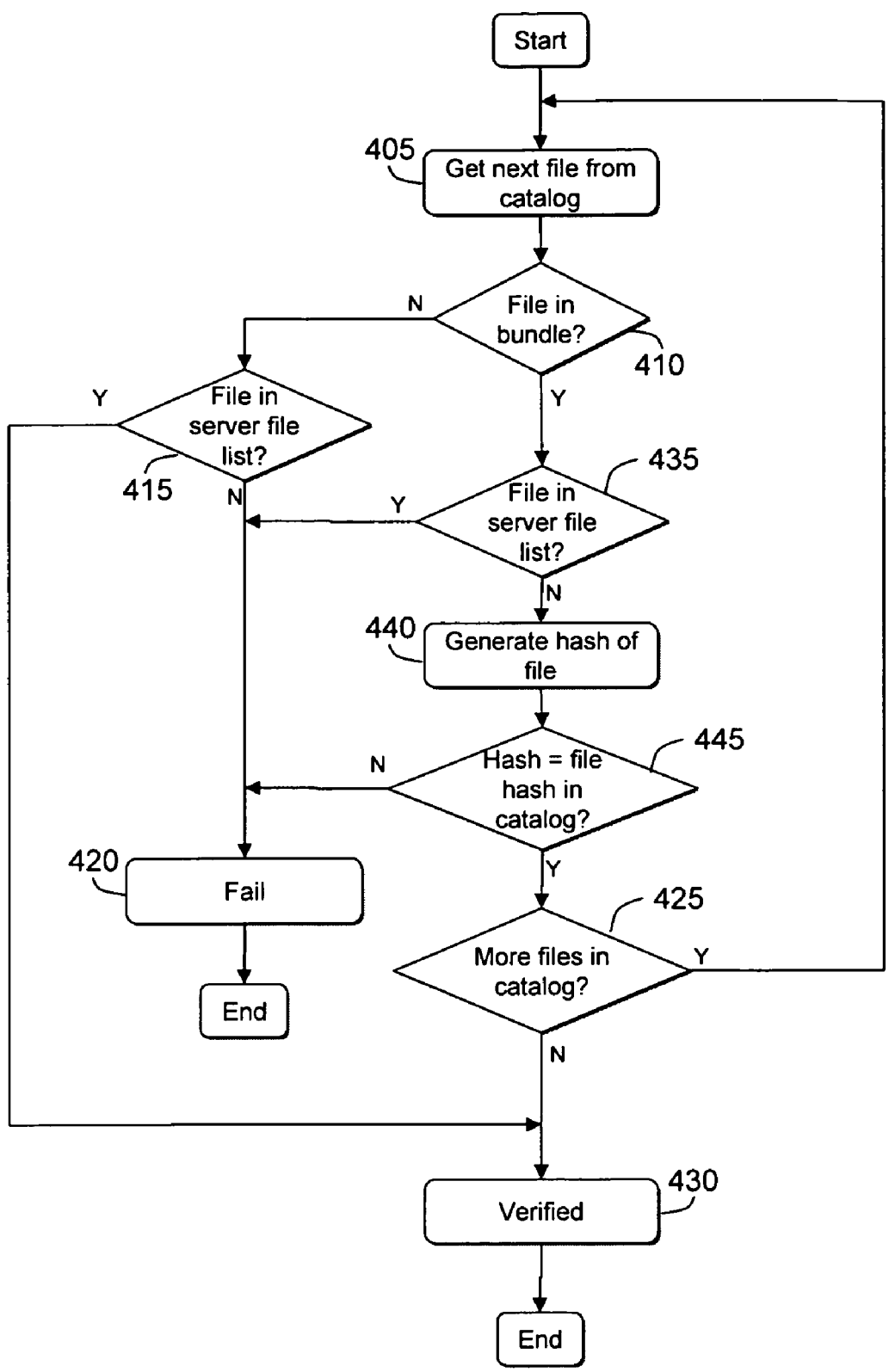
FIG. 4 depicts in a flow chart exemplary steps of verifying a modified bundle in accordance with the present disclosure.

FIG. 4 depicts in a flow chart exemplary steps of verifying a modified bundle. The method begins when a modified bundle is to be verified. The modified bundle should be successfully verified if the only change made to the bundle is the removal of files specified in a server file list file. The server file list file may be part of the modified bundle or it may be sent separate from the modified bundle. The modified bundle comprises one or more files, a catalog of all of the files in the bundle as well as the hash of each file at the time the bundle was signed, and catalog signature file. At step 405 a next file is determined from the catalog file. Determining the next file from the catalog typically includes retrieving a file name from the catalog file. Since the catalog file has a known structure it is possible to determine, and retrieve, the name of the next file from the catalog file. Once the next file is determined, the modified file set of the modified signed bundle is checked, at step 410, to determine if the file is in the modified file set of the modified signed bundle. If the file is not in the modified file set, the server file list is checked at step 415 to determine if the file is in the server file list. If the file is not in the server file list, verification fails at step 420.

If at step 415 it is determined that the file is in the server file list, then at step 425 it is determined if there are more files in the file catalog. If there are no more files in the catalog file then at step 430 the modified signed bundle is successfully verified. If there are more files, then the next file is determined from the catalog file at step 405.

If at step 410 it is determined that the file is in the modified file set of the modified signed bundle, then at step 435 it is determined if the file is in the server file list. If the file is in the server file list, then the modified signed bundle verification fails at step 420. If the file is not in the server file list then at step 440 a hash of the file is generated by using the same secure hash algorithm that generated the hash of the file stored in the catalog file from the file in the modified file set of the modified signed bundle. At step 445 the generated file hash is compared to the file hash stored in the catalog file. If the two file hashes do not match, then the verification of the modified signed bundle fails at step 420. If the two file hashes match, then at step 425 it is determined if there are more files in the catalog file, and if there are not then the modified signed bundle is successfully verified at step 430.

Figure 5:
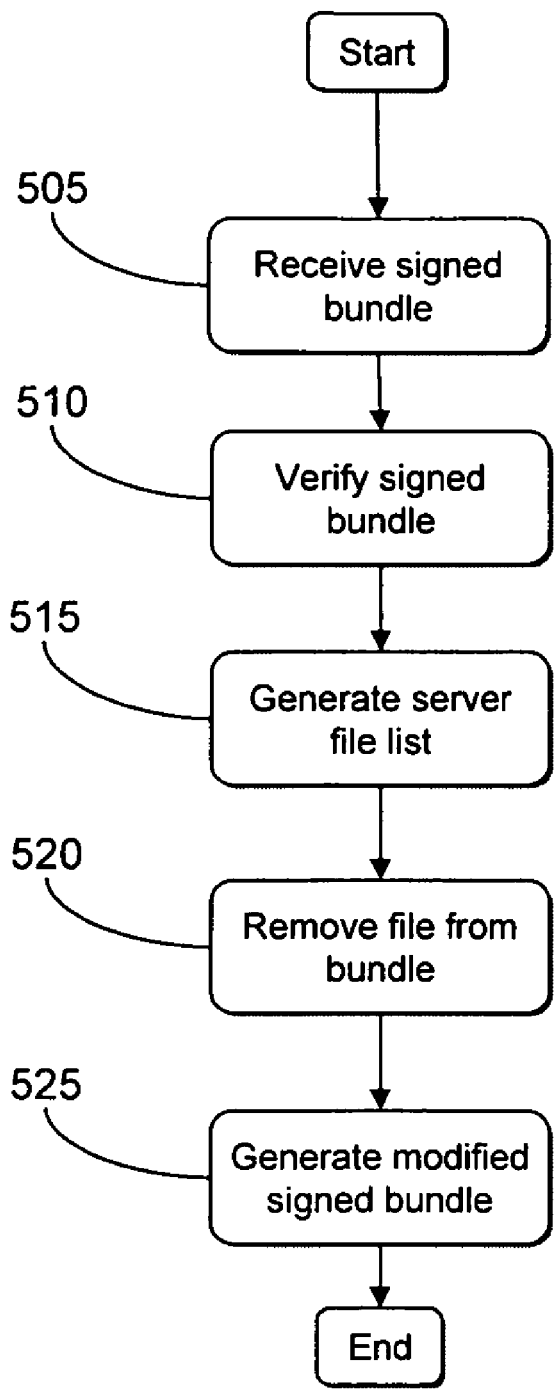
FIG. 5 depicts in a flow chart exemplary steps of modifying a signed bundle in accordance with the present disclosure.

FIG. 5 depicts in a flow chart exemplary steps of modifying a signed bundle in accordance with the present disclosure. The method begins at step 505 when a signed bundle is received. The signed bundle may be received by a server. The signed bundle comprises a plurality of files, a catalog file and a catalog digital signature file. The catalog file includes an indication of the plurality of files in the signed bundle, as well as a hash associated with each file. The signed bundle may further include a verification key for use in verifying the signed bundle. The catalog digital signature file is a signature of the catalog file, and can be used to verify that the catalog file has not been modified since the signature catalog file was created.

Once the signed bundle has been received, it is verified at step 510. Verifying the signed bundle may be accomplished by verifying that the catalog file has not been modified using the catalog digital signature file, and the verification key, which may be included in the signed bundle, or may be available by other means, such as separate key distribution. Once the catalog file is verified, it may be trusted that the catalog file has not been modified. Each file of the plurality of files can be verified by generating a hash and verifying that the generated hash matches the hash associated with the file stored in the verified catalog file, which is trusted to not have been modified. Additionally, or alternatively, if a server file list is included in the signed bundle, it may be identified and verified by generating and verifying a hash of the server file list file. The files specified in the server file list file may then be verified by generating and verifying their respective hashes. This may reduce the amount of processing that is required to modify a signed bundle on the server since only the files intended for the server are verified by checking their hashes.

At step 515 a server file list is generated. The generated server file list specifies one or more files to be removed from the signed bundle in order to generate the modified signed bundle. The server file list may be generated in different ways. For example, the server file list information may be received at the server, and then the server file list generated using the received server file list information. Alternatively the server file list information may be included as a file of the signed bundle, in which case the server file list file is identified from the plurality of files of the signed bundle, for example using the position of the file in the signed bundle, such as the last file or the first file. The server file list file may also be identified by, for example, a file name or an extension type. Once the server file list file has been identified it is used to generate the server file list. Alternatively server file list information may be included as part of the catalog file. For example, for each file in the catalog, in addition to the associated hash, the catalog may store an associated server file list indication of whether the file is part of the server file list (i.e. the file is to be removed from the signed bundle). The server file list may be generated from the server file list information associated with the files in the catalog file.

At step 520, the files specified in the generated server file list are removed from the plurality of files of the signed bundle. At step 525 the modified signed bundle is generated. The modified signed bundle comprises another plurality of files, which include the plurality of files of the signed bundle with the files specified in the server file list removed. The catalog file of the modified signed bundle may be the same, or a copy, of the catalog file of the signed bundle. The catalog file will include associated hash information, and server file list indication information if used for the plurality of files of the modified signed bundle as well as for the files specified in the generated server file list that were removed from the signed bundle. The catalog digital signature file of the modified signed bundle is the same, or a copy, of the catalog digital signature file of the signed bundle. Once the signed bundle has been modified, the generated modified signed bundle may be sent to a device. If the signed bundle did not included server file list information, the generated server file list may also be sent to the device. If the signed bundle included server file list information, for example but not limited to, as a file of the signed bundle, or as information stored in the catalog, the generated server file list does not need to be sent to the device, as it will be included in the modified signed bundle. When the signed bundle includes a server file list file as one of the files of the signed bundle, it should not specify itself as a file to be removed. If the server file list file were included in the server file list it would not be included in the modified server bundle, and possibly would not be received at the device. The server file list may be sent to the device by different ways as well, such as during application provisioning including the information in the provisioned application (for example by hard coding), or through communicating the information to the device over a secure channel.

Figure 6:
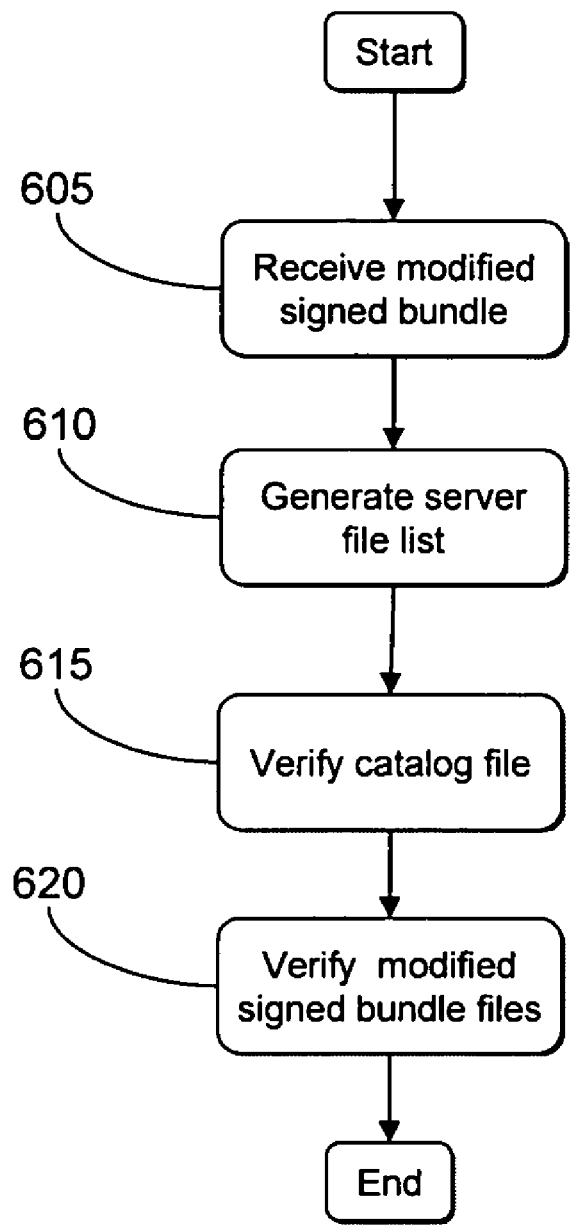
FIG. 6 depicts in a flow chart exemplary steps of verifying a modified signed bundle on a device in accordance with the present disclosure.

FIG. 6 depicts in a flow chart exemplary steps of verifying a modified signed bundle on a device in accordance with the present disclosure. The method begins at step 605 when a modified signed bundle is received, for example at a device. At step 610 a server file list is generated. The server file list may be generated by information included in a file of files of the modified signed bundle, or in the catalog file of the modified signed bundle, or by server file list information received separately at the device. Once the modified bundle has been received and the server file list generated, the modified signed bundle is verified. At step 615 the catalog file is verified to ensure it has not been modified since it was signed. The catalog file may be verified using the catalog digital signature file and verification key of the modified signed bundle. It is understood that the catalog may be verified prior to generating the server file list. Once the catalog file is verified, the modified signed bundle files are verified at step 620. This may include processing the catalog file, and for each file indicated in the catalog file ensuring that the indicated file is included in the files of the modified signed bundle and that generated file hashes match the associated hashes stored in the catalog, and if the file is not included in the modified signed bundle, checking to see if the file is specified in the generated server file list. The verification may further include ensuring no files are included in the files of the plurality of files of the modified signed bundle that are indicated by the generated server file list or that are not indicated in the catalog file.

Figure 7A:
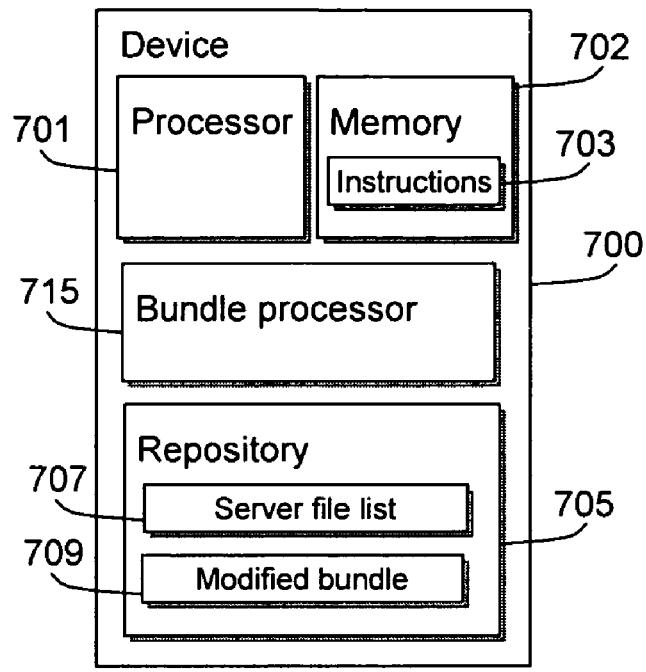
FIG. 7a depicts in a block diagram exemplary logical components of a device in accordance with the present disclosure.

FIG. 7a depicts in a block diagram exemplary logical components of a device in accordance with the present disclosure. The device 700 comprises a repository 705 for storing a server file list 707 and a modified bundle 709. The repository 705 may be part of device memory 702. The memory 702 may also store instructions 703 for execution by a processor 701 of the device. The instructions 703 when executed by the processor 702 implement a bundle processor 715. The server file list 707 and the modified bundle 709 may be stored in the repository 705 in various ways, such as by provisioning over the air, or cable connection, or by hard coding the repository 705. The server file list may also be received with the modified signed bundle as a file in the modified file set and stored in the repository 705. The bundle processor 715 verifies the modified signed bundle's catalog digital signature file and verifies the files of the modified signed bundle.

Figure 7B:
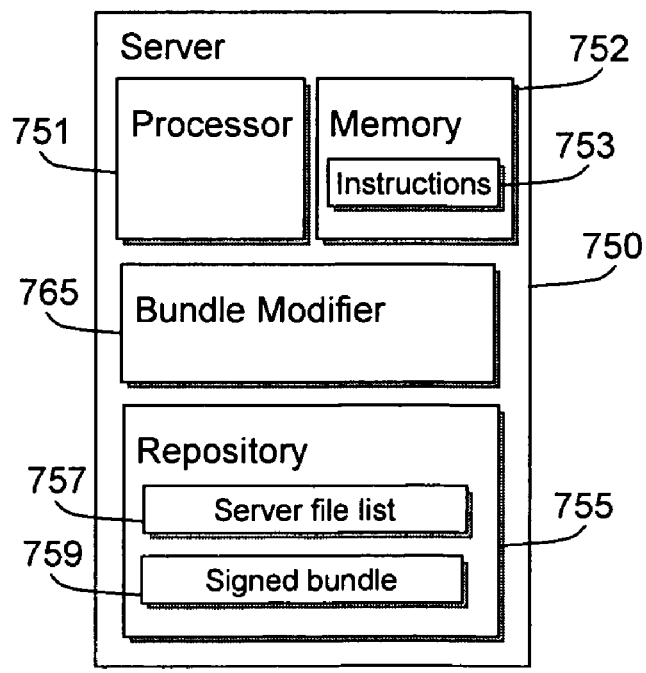
FIG. 7b depicts in a block diagram exemplary logical components of a server in accordance with the present disclosure.

FIG. 7b depicts in a block diagram exemplary logical components of a server 750 in accordance with the present disclosure. The server 750 comprises a repository 755 for storing a server file list 757 and a signed bundle 759. The repository may be part of server memory 752. The memory 752 may also store instructions 753 for execution by a processor 751 of the server. The instructions 753 when executed by the processor 751 implement a bundle modifier 765. The server file list 757 and the signed bundle 759 may be stored in the repository 755 in various ways, such as by provisioning over the air, or cable connection, or by hard coding the repository. The server file list 757 may also be received with the signed bundle 759 as a file in the file set and stored in the repository. The bundle modifier 765 verifies the signed bundle's catalog digital signature file and verifies the files of the signed bundle. The bundle modifier 765 also removes a file specified in the server file list 757 from the signed bundle 759 to generate the modified signed bundle.

Figure 8:
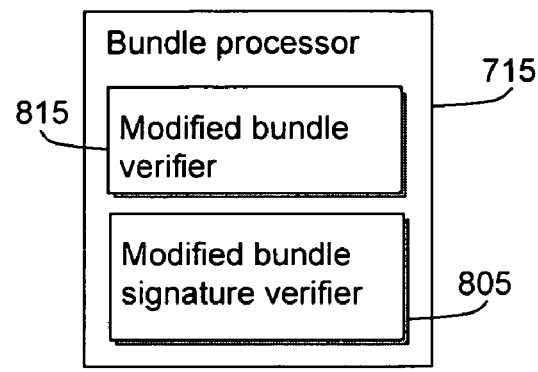
FIG. 8 depicts in a block diagram exemplary logical components of a bundle processor in accordance with the present disclosure.

FIG. 8 depicts in a block diagram exemplary logical components of a bundle processor 715. The bundle processor 715 comprises a modified signed bundle signature verifier 805 and a modified signed bundle verifier 815. The modified signed bundle signature verifier 805 may be implemented by executing instructions on the device processor. The instructions for the modified bundle signature verifier 805 may be stored in device memory and may comprise instructions for implementing the method of verifying a modified signed bundle catalog digital signature file described above. The modified bundle verifier 815 may be implemented by executing instructions on the device processor. The instructions for the modified signed bundle signature verifier 805 may be stored in device memory and may comprise instructions for implementing the method of verifying a modified signed bundle described above.

Figure 9:
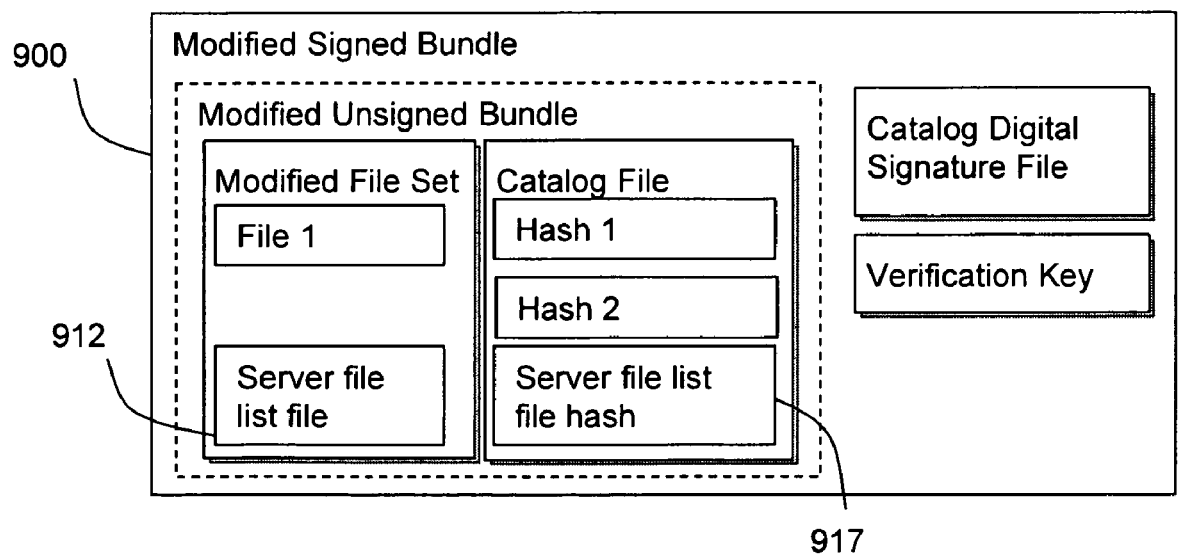
FIG. 9 depicts in a logical block diagram, components of a modified signed bundle in accordance with a further embodiment of the present disclosure.

FIG. 9 depicts in a logical block diagram, components of a modified signed bundle 900 in accordance with a further embodiment of the present disclosure. The modified signed bundle 900 is similar to the modified signed bundle 101 of FIG. 1*b*; however, the modified signed bundle 900 includes the server file list specifying the files to remove from the modified signed bundle 900 as a server file list file 912. The server file list file 912 may be included as, for example, the last file. The server file list file 912 may be included in any file position within the bundle, provided the server file list file 912 can be differentiated from the other files. For example the server file list file 912 could be identified using a standard name such as 'ServerList' or it may be identified using an extension type, such as '.sl'. Other ways of differentiating the server file list file 912 from the other files of the bundle, for identifying the server file list file 912, are possible. When a server receives the signed bundle 100 it verifies the signed bundle 100 as described above, and if the signed bundle is verified, the server file list file 912 is retrieved from the file set. The server then removes the files specified in the server file list file 912, to create the modified signed bundle 900. The modified server bundle 900 includes the server file list file 912 in the modified file set. When the device receives the modified signed bundle 900, it verifies the catalog digital signature file, and if it is verified, the device then checks the hash 917 of the server file list file 912, for example but not limited to, the last file in the modified file set, or the file that is identified as the server file list file 912. If the hash is verified, then the device verifies the modified signed bundle 900 using the server file list file 912 sent in the modified signed bundle 900.

In the embodiment of FIG. 9 the server file list is created (and included in the bundle) when the bundle is signed. A person signing the bundle should be authorized to create the server file list. It may be desirable to limit the people that are authorized to create server file lists. If the person signing the bundle is not authorized to create a server file list, then it should not be included in the bundle before the bundle is signed. If the server file list is not created when the bundle is signed, then it will be distributed to the server and device, since adding it to the bundle would cause the verification of the signed bundle or the modified signed bundle to fail since a file was added. The server file list may be distributed by an administrator, for example, over a secure connection or other means.

It may not be possible to restrict an unauthorized person from including a server file list file 912 in a bundle he or she signed. If the server file list file 912 is sent in the modified bundle, the server and device should have a mechanism for determining if the signer was authorized to include the server file list file 912. This may include, for example, verifying the identity of the signer using the certificate information. If the signer is not authorized to create server file lists, then the bundle should not be processed by the server, or the device.

Figure 10:
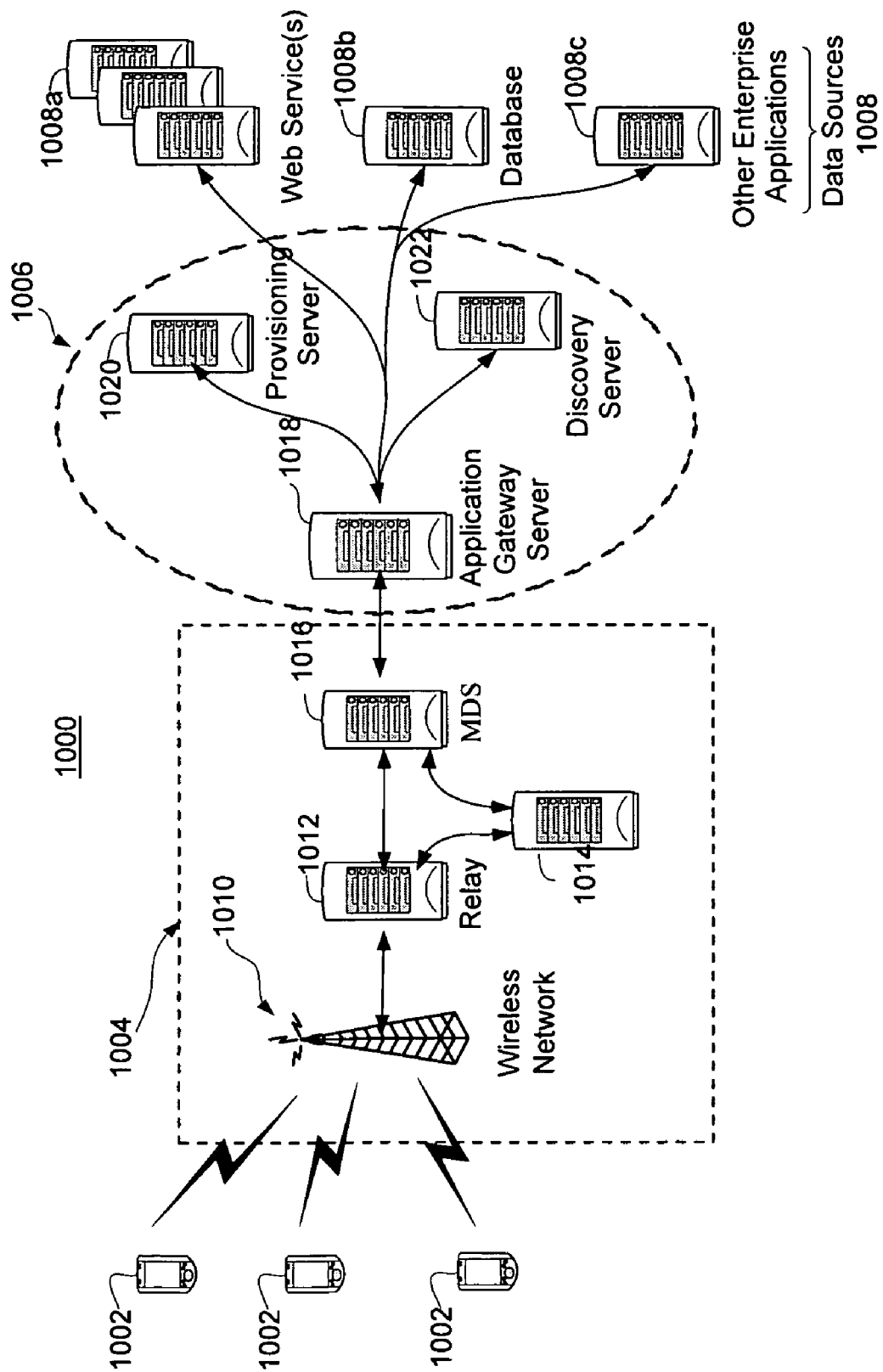
FIG. 10 depicts in a block diagram exemplary components of a suitable communication infrastructure in which various embodiments of the present disclosure may be implemented.

FIG. 10 depicts in a block diagram exemplary components of a suitable communication infrastructure 1000 in which various embodiments of the present disclosure may be implemented. The communication infrastructure 1000 comprises a plurality of wireless devices 1002, a communication network 1004, an application gateway 1006, and a plurality of back-end services 1008.

The wireless devices 1002 may comprise mobile phones, smart phones, handheld devices, personal digital assistants (PDAs), or other devices. Each of the wireless devices 1002 includes a runtime environment capable of hosting a plurality of component applications.

The wireless devices 1002 are in communication with the application gateway 1006 via the communication network 1004. Accordingly, the communication network 1004 may include several components such as a wireless network 1010, a relay 1012, a corporate server 1014 and/or a mobile data server (MDS) 1016 for relaying data between the wireless devices 1002 and the application gateway 1006.

The application gateway 1006 comprises a gateway server 1018, a provisioning server 1020 and a discovery server 1022. The gateway server 1018 generally acts as a message broker between the runtime environment on the wireless devices 1002 and the back-end services 1008. The gateway server 1018 may be in communication with both the provisioning server 1020 and/or the discovery server 1022. The provisioning server 1020 and the discovery server 1022 generally provide enterprise services. The gateway server 1010 may further be in communication with a plurality of the back-end services 1008, such as Web services 1008*a*, database services 1008*b*, as well as other enterprise services 1008*c*, via a suitable link. For example, the gateway server 1018 is connected with the Web services 1008*a* and database services 1008*b* via Simple Object Access Protocol (SOAP) and Java Database Connectivity (JDBC) respectively. Other types of back-end services 1008 and their corresponding links can be connected to the gateway server 1018.

In accordance with various embodiments of the present disclosure, each wireless device 1002 is initially provisioned with a service book or IT policy facility. The service book, or IT policy facility, establishes various protocols and settings for the wireless device, including connectivity information for the corporate server 1014 and/or the mobile data server 1016. These parameters may include a uniform resource locator (URL) for the application gateway server 1018 as well as its encryption key. Alternatively, if the wireless device 1002 is not initially provisioned with the URL and encryption key, they may be pushed to the wireless device 1002 via the mobile data server 1016. The mobile device 1002 can then connect with the application gateway 1006 via the URL of the application gateway server 1018.

Figure 11:
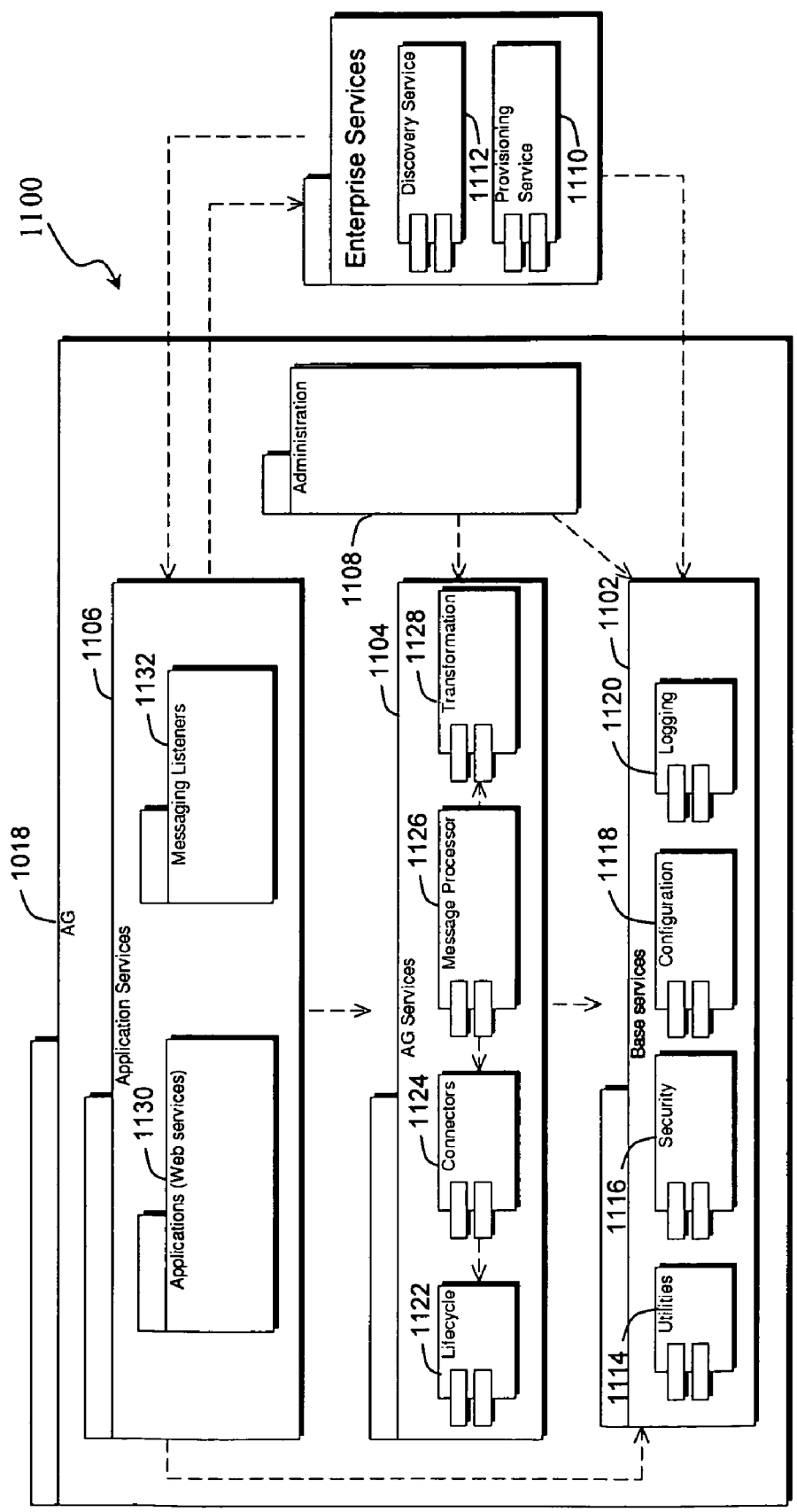
FIG. 11 depicts in a block diagram a more detailed view of an exemplary application gateway.

FIG. 11 shows a more detailed view of an exemplary application gateway 1100. The application gateway server 1018 generally includes various layers of service, such as a base services layer 1102, an application gateway services layer 1104 and an application services layer 1106. The application gateway server 1018 further includes an administration service 1108.

A provisioning service 1110 and a discovery service 1112 are provided by the provisioning server 1020 and discovery server 1020, respectively.

At the lowest level, the base services layer 1102 offers basic, domain-independent system services to other subsystems in higher levels. Thus, for example, all subsystems in the application gateway services layer 1104 and the application services layer 1106 can utilize and collaborate with the subsystems in the base services layer 1102. In the present embodiment, the base services layer 1102 includes a utilities subsystem 1114, a security subsystem 1116, a configuration subsystem 1118, and a logging subsystem 1120.

The application gateway services layer 1104 provides wireless component application domain-specific services. These services provide message transformation and delivery to back-end services 1008 and provide wireless device 1002 and component application lifecycle management. In the present embodiment, the application gateway services layer 1104 includes a lifecycle subsystem 1122, a connector subsystem 1124, a messaging subsystem 1126, and a transformation subsystem 1128.

The application services layer 1106 provides external program interfaces and user interfaces using subsystems provided by the lower layers. For example, various applications such as a service provider lifecycle application, a packaging application or a message listening application provides external program interfaces since they communicate primarily with applications on external systems. For example, the messaging listening application (or messaging listeners 1132) provides an interface for receiving messages from the wireless devices 1002 as well as external sources and forwarding them to the messaging subsystem. Further, the message listening application 1132 typically authenticates that the source of the message is valid.

Other applications 1130 may provide a user interface for accessing and potentially modifying application gateway data and/or parameters.

The administration service 1108 is responsible for administrative system messages, administration of the wireless devices 1002, runtime administration of the application gateway subsystems, support and display system diagnostics, and administration of default implementations of the provisioning and discovery services.

Figure 12:
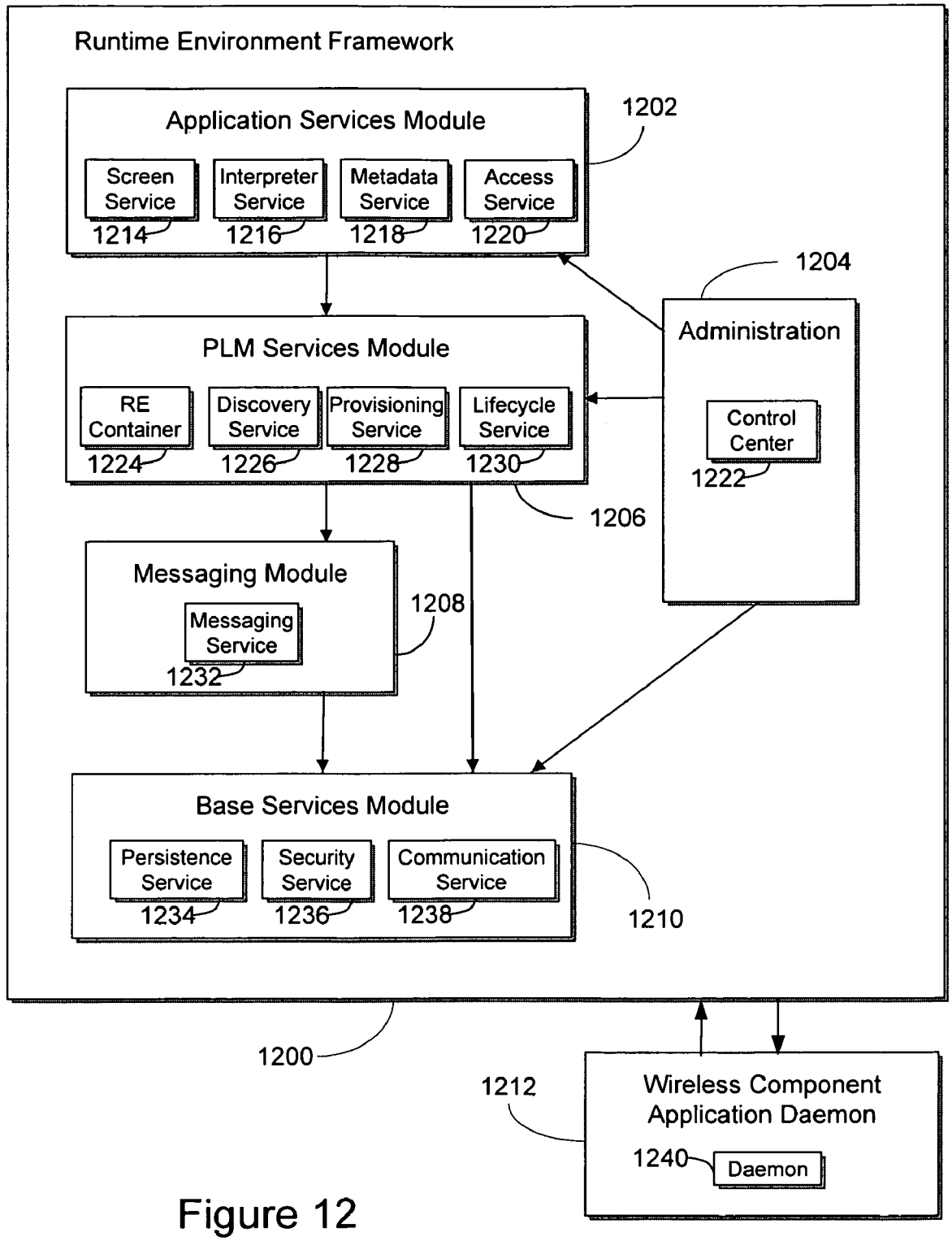
FIG. 12 depicts in a block diagram an example of a runtime environment framework.

FIG. 12 shows an example of a runtime environment framework 1200. The runtime environment framework 1200 comprises various components, such as an application services module 1202, an administration module 1204, a provisioning and lifecycle management (PLM) services module 1206, a messaging module 1208, and a base services module 1210. Components may be removed or added to the runtime environment framework 1200.

The application services module 1202 may include, for example, a screen service 1214 for providing an interface between currently running applications and a user, an interpreter service 1216 for providing an execution environment for the applications, a metadata service 1218 for handling and mediating application metadata related access, and an access service 1220 for allowing applications to access other applications on the device 1002.

The administration module 1204 includes a control center 1222 for handling a user interface of the wireless component application runtime environment framework 1200, processing user interaction with the wireless component application runtime environment framework 1200, and for integrating the wireless component application runtime environment framework 1200 with the network system 1000.

The PLM services module 1206 includes a runtime environment container 1224 for coordinating runtime environment container upgrades and backup/restore processes and for implementing a default error handling mechanism for the RE framework 1200, a discovery service module 1226 for locating applications in an application repository, a provisioning service 1228 for application provisioning (including application downloads, installation and upgrades), and a lifecycle service 1230 for registering, maintaining information for, and administrating applications.

The messaging module 1208 includes a messaging service module 1232 for message queuing, message (de)compacting, and message distribution.

The base services module 1210 includes a persistence service 1234 for storing a runtime environment profile (including version, directory, client administration policy, application administration policies, security keys, available upgrades, etc.), storing an application profile (including version, metadata, application persistence data components, persistent application global data and application resource, available upgrades, etc.), and storing reliable messages (including outgoing messages pending delivery due to out of coverage, and incoming reliable messages pending processing). The base services module 1210 also includes a security service 1236 for restricting access to runtime environment services, providing message authentication, integrity, and encryption. The base services module 1210 also includes a communication service 1238 for sending and receiving messages in and out of the device 1002, downloading resources and files from appropriate repositories, and notifying interested runtime environment services about wireless coverage events.

The runtime environment framework 1200 may communicate with a wireless component application daemon 1212. The wireless component application daemon module 1212 includes a daemon 1240 for restarting the wireless component application process whenever it stops due to a fatal exception.

Embodiments within the scope of the present disclosure can be implemented in digital electronic circuitry, or in computer hardware, firmware, software, or in combinations thereof. Apparatus within the scope of the present disclosure can be implemented in a computer program product tangibly embodied in a machine-readable storage device for execution by a programmable processor; and method actions within the scope of the present disclosure can be performed by a programmable processor executing a program of instructions to perform functions of the present disclosure by operating on input data and generating output. Embodiments within the scope of the present disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special-purpose microprocessors. Generally, a processor will receive instructions and data from a read-only memory and/or a random access memory. Generally, a computer will include one or more mass storage devices for storing data files. Embodiments within the scope of the present disclosure include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits). While particular embodiments of the present disclo-

What is claimed is:

1. A method of processing a signed bundle, the method comprising:
receiving the signed bundle at a server, the signed bundle comprising a first plurality of files, a catalog file specifying the first plurality of files and a hash for each of the first plurality of files, and a catalog signature obtained by signing the catalog file;
verifying the received signed bundle on the server;
generating a server file list specifying at least one file of the first plurality of files to be removed from the signed bundle at the server; and
removing the at least one file specified in the server file list from the first plurality of files of the signed bundle to generate a modified signed bundle for sending to a device,
the modified signed bundle comprising:
a second plurality of files comprising all of the files in the first plurality of files except the at least one file specified in the server file list;
the catalog file of the signed bundle, the catalog file not being modified by the server despite removal of the at least one file specified in the server file list from the first plurality of files of the signed bundle, such that the hash of the at least one file specified in the server file list remains in the catalog file; and
the catalog signature of the signed bundle, the catalog signature not being modified by the server despite the removal of the at least one file specified in the server file list from the first plurality of files of the signed bundle.

2. The method as claimed in claim 1, wherein generating the server file list comprises:
including the server file list as a server file list file in the first plurality of files in the signed bundle;
identifying the server file list file from the first plurality of files in the signed bundle; and
generating the server file list from the identified server file list file.

3. The method as claimed in claim 1, wherein the server file list is sent to the device in the modified signed bundle.

4. The method as claimed in claim 1, wherein generating the server file list comprises:
receiving a file comprising server file list information; and
generating the server file list from the received server file list information.

5. The method as claimed in claim 1, further comprising:
sending the generated server file list to the device; and
sending the modified signed bundle to the device.

6. The method as claimed in claim 1, wherein verifying the received signed bundle comprises:
verifying the catalog file using the catalog signature to ensure the catalog file has not been modified since signing; and
verifying each file of the first plurality of files in the signed bundle by generating a hash of each file and verifying that the generated hash matches a corresponding hash for the each file in the associated file hashes in the catalog file of the signed bundle.

7. The method as claimed in claim 1, wherein the second plurality of files comprises no additional files not specified in the catalog file.

8. The method as claimed in claim 2, wherein identifying the server file list file comprises one of:
identifying the server file list file based on a file position within the signed bundle;
identifying the server file list file based on a file name; and
identifying the server file list file based on a file extension.

9. The method as claimed in claim 2, wherein verifying the received signed bundle comprises:
verifying the catalog file using the catalog signature to ensure the catalog has not been modified since signing; and
verifying the server file list file by generating a hash of the server file list file and verifying that the generated hash matches a stored hash associated with the server file list file in the catalog file of the signed bundle.

10. The method as claimed in claim 6, wherein the server file list is included in the modified signed bundle sent to the device.

11. The method as claimed in claim 5, further comprising:
receiving the generated server file list on the device;
receiving the modified signed bundle on the device; and
verifying the received modified signed bundle on the device using the received generated server file list.

12. The method as claimed in claim 9, further comprising:
verifying the at least one file to be removed from the signed bundle specified in the generated server file list by, for each of the at least one file to be removed, generating a hash of the file to be removed and verifying that the generated hash matches the stored hash associated with the file to be removed in the catalog file of the signed bundle.

13. A method of verifying a modified signed bundle on a device, the method comprising:
receiving the modified signed bundle at the device, the modified signed bundle being generated from a signed bundle that comprises: a first plurality of files, a catalog file specifying the first plurality of files and a hash for each of the first plurality of files, and a catalog signature obtained by signing the catalog file, the modified signed bundle comprising:
a second plurality of files comprising all of the files in the first plurality of files except at least one file removed from the first plurality of files of the signed bundle;
the catalog file of the signed bundle, the catalog file not having been modified despite removal of the at least one file from the first plurality of files of the signed bundle, such that the hash of the at least one file removed from the first plurality of files of the signed bundle remains in the catalog file, and
the modified signed bundle further comprising the catalog signature file of the signed bundle, the catalog signature file not having been modified despite the removal of the at least one file from the first plurality of files of the signed bundle;
generating a server file list specifying the at least one file removed from the first plurality of files of the signed bundle;
verifying the catalog file using the catalog signature file to ensure the catalog file has not been modified since signing;
verifying each file specified in the catalog file by:
verifying that the file is either specified in the generated server file list or is included in the second plurality of files of the modified signed bundle; and
if the file is included in the second plurality of files of the modified signed bundle, verifying the file by generating a hash of the file and verifying that the generated hash matches a corresponding hash for the file in the catalog file of the modified signed bundle.

14. The method as claimed in claim 13, wherein the second plurality of file comprises no additional files not specified in the catalog file, and wherein the method further comprises verifying that each file of the second plurality of files is specified in the catalog file and is not specified in the generated server file list.

15. The method as claimed in claim 13, wherein generating the server file list comprises:
 including the server file list as a server file list file in the second plurality of files in the modified signed bundle;
 identifying the server file list file from the second plurality of files in the modified signed bundle; and
 generating the server file list from the identified server file list.

16. The method as claimed in claim 13, wherein generating the server file list comprises:
 receiving at the device a file comprising server file list information; and
 generating the server file list from the received server file list information.

17. The method as claimed in claim 15, wherein identifying the server file list file comprises one of:
 identifying the server file list file based on a file position within the modified signed bundle;
 identifying the server file list file based on a file name; and
 identifying the server file list file based on a file extension.

18. A system for modifying a signed bundle, the system comprising:
 a memory for storing instructions;
 a processor for executing the instructions stored in memory;
 a repository for storing:
  a server file list specifying at least one file to be removed from the signed bundle to generate a modified signed bundle; and
  the signed bundle comprising:
   a first plurality of files;
   a catalog file comprising:
    a list of the first plurality of files in the signed bundle; and
    a hash for each file in the signed bundle; and
   a catalog signature file obtained by signing the catalog file; and
 a bundle modifier for removing the at least one file specified in the server file list from the first plurality of files of the signed bundle to generate the modified signed bundle; wherein the modified signed bundle comprises:
  a second plurality of files comprising all of the files in the first plurality of files except the at least one file specified in the server file list;
  the catalog file of the signed bundle, the catalog file not being modified despite removal of the at least one file specified in the server file list from the first plurality of files of the signed bundle, such that the hash of the at least one file specified in the server file list remains in the catalog file; and
  the catalog signature of the signed bundle, the catalog signature not being modified despite the removal of the at least one file specified in the server file list from the first plurality of files of the signed bundle.

19. A server comprising the system as claimed in claim 18 and a communications interface for sending the modified signed bundle using a network infrastructure.

20. The system as claimed in claim 18, wherein the second plurality of files comprises no additional files not specified in the catalog file.

21. A system for verifying a modified signed bundle, the system comprising:
 a memory for storing instructions;
 a processor for executing the instructions stored in memory;
 a repository for storing:
  a server file list specifying at least one file removed from a signed bundle to generate the modified signed bundle, the signed bundle comprising a first plurality of files, a catalog file specifying the first plurality of files and a hash for each of the first plurality of files, and a catalog signature obtained by signing the catalog file; and
  the modified signed bundle, the modified signed bundle comprising:
   a second plurality of files comprising all of the files in the first plurality of files except the at least one file specified in the server file list;
   the catalog file of the signed bundle, the catalog file not having been modified despite removal of the at least one file specified in the server file list from the first plurality of files of the signed bundle, such that the hash of the at least one file specified in the server file list remains in the catalog file; and
   the catalog signature of the signed bundle, the catalog signature not having been modified despite the removal of the at least one file specified in the server file list from the first plurality of files of the signed bundle; and
 a bundle processor capable of
  verifying the catalog file using the catalog signature file to ensure the catalog file has not been modified since signing, and
  verifying each file specified in the catalog file by:
   verifying that the file is either specified in the generated server file list or is included in the second plurality of files of the modified signed bundle; and
   if the file is included in the second plurality of files of the modified signed bundle, verifying the file by generating a hash of the file and verifying that the generated hash matches a corresponding hash for the file in the catalog file of the modified signed bundle.

22. The system as claimed in claim 21, wherein the second plurality of files comprises no additional files not specified in the catalog file, and wherein the bundle processor is capable of verifying that each file of the second plurality of files is specified in the catalog file and is not specified in the generated server file list.

23. A mobile device comprising the system as claimed in claim 21 and a wireless receiver for receiving the modified signed bundle.

* * * * *

UNITED STATES PATENT AND TRADEMARK OFFICE
CERTIFICATE OF CORRECTION

PATENT NO. : 8,214,646 B2
APPLICATION NO. : 12/115799
DATED : July 3, 2012
INVENTOR(S) : Alexander Sherkin and Michael Brown It is certified that error appears in the above-identified patent and that said Letters Patent is hereby corrected as shown below:

In the Claims

1. Claim 10, Col. 14, line 14, – "The method as claimed in claim 6, wherein the server" should read -- The method as claimed in claim 5, wherein the server --.

2. Claim 13, Col. 14, line 48 – "The modified signed bundle further comprising the catalog signature file of the signed bundle" should read -- the catalog signature file of the signed bundle --.

Signed and Sealed this
Twenty-eighth Day of May, 2013

Teresa Stanek Rea
*Acting Director of the United States Patent and Trademark Office*